United States Patent
Linke et al.

(10) Patent No.: US 10,589,453 B2
(45) Date of Patent: Mar. 17, 2020

(54) DEVICE AND METHOD FOR TRANSPORTING PREFORMS IN THE REGION OF A BLOW-MOLDING MACHINE

(71) Applicant: KHS Corpoplast GmbH, Hamburg (DE)

(72) Inventors: Michael Linke, Hamburg (DE); Rolf Baumgarte, Ahrensburg (DE); Dieter Klatt, Hamburg (DE); Frank Lewin, Tangstedt (DE)

(73) Assignee: KHS Corpoplast GmbH, Hamburg (DE)

( * ) Notice: Subject to any disclaimer, the term of this patent is extended or adjusted under 35 U.S.C. 154(b) by 247 days.

(21) Appl. No.: 15/538,934

(22) PCT Filed: Jan. 18, 2016

(86) PCT No.: PCT/EP2016/000078
§ 371 (c)(1),
(2) Date: Jun. 22, 2017

(87) PCT Pub. No.: WO2016/116266
PCT Pub. Date: Jul. 28, 2016

(65) Prior Publication Data
US 2018/0015657 A1    Jan. 18, 2018

(30) Foreign Application Priority Data
Jan. 22, 2015 (DE) .......... 10 2015 000 631

(51) Int. Cl.
*B29C 49/42* (2006.01)
*B29C 49/78* (2006.01)
(Continued)

(52) U.S. Cl.
CPC ...... *B29C 49/4205* (2013.01); *B29C 49/4252* (2013.01); *B29C 49/78* (2013.01);
(Continued)

(58) Field of Classification Search
CPC . B29C 49/4205; B29C 49/4252; B29C 49/78; B29C 49/06
See application file for complete search history.

(56) References Cited

U.S. PATENT DOCUMENTS

| 3,488,994 A | 1/1970 | Messervey et al. |
| 7,264,113 B2 * | 9/2007 | Hartness ................ B65G 17/06 198/470.1 |

(Continued)

FOREIGN PATENT DOCUMENTS

| DE | 2913702 C2 | 8/1982 |
| DE | 2704614 C2 | 9/1982 |

(Continued)

*Primary Examiner* — Kelly M Gambetta
(74) *Attorney, Agent, or Firm* — Rankin, Hill & Clark LLP

(57) ABSTRACT

The invention relates to devices and methods for transporting preforms (2) made of a thermoplastic material in the region of a blow-molding (10), having a transport wheel (12) which is mounted in a rotatable manner about a rotational axis and which comprises multiple receiving recess (18) distributed in the circumferential direction over the circumference of the transport wheel for receiving and conveying preforms (20). A hook element (14) is arranged on the transport wheel (12) in the region of each receiving recess (18), said hook element being mounted on the transport wheel (12) in a pivotal manner between an open position and a closed position, and in the closed position, the hook element (14) secures a preform (20) to be transported in the respective receiving recess (18) from falling out of the receiving recess (18).

21 Claims, 4 Drawing Sheets

(51) Int. Cl.
*B29L 31/00* (2006.01)
*B29C 49/06* (2006.01)

(52) U.S. Cl.
CPC .... *B29C 49/06* (2013.01); *B29C 2949/78773* (2013.01); *B29L 2031/7158* (2013.01)

(56) References Cited

U.S. PATENT DOCUMENTS

| | | | | |
|---|---|---|---|---|
| 9,181,042 | B2* | 11/2015 | Fahldieck | B65G 47/846 |
| 2002/0167185 | A1* | 11/2002 | Graffin | B65G 29/00 |
| | | | | 294/104 |

FOREIGN PATENT DOCUMENTS

| | | |
|---|---|---|
| DE | 29517091 U1 | 12/1995 |
| DE | 19737527 A1 | 3/1999 |
| DE | 20114032 U1 | 10/2002 |
| DE | 60021428 T2 | 5/2006 |
| DE | 60115573 T2 | 6/2006 |
| DE | 102006012020 A1 | 9/2007 |
| DE | 102010049385 A1 | 4/2012 |
| DE | 102012102073 A1 | 9/2013 |
| DE | 102012101915 A9 | 11/2013 |
| EP | 1413366 A1 | 4/2004 |
| EP | 2239215 A2 | 10/2010 |
| FR | 2895384 A1 | 6/2007 |
| JP | 2010076915 A | 4/2010 |
| WO | 2014108287 A1 | 7/2014 |

* cited by examiner

DEVICE AND METHOD FOR TRANSPORTING PREFORMS IN THE REGION OF A BLOW-MOLDING MACHINE

CROSS-REFERENCE TO RELATED APPLICATIONS

This application is a U.S. National Stage of PCT/EP2016/000078, filed Jan. 18, 2016, and claims priority to DE 10 2015 000 631.2, filed Jan. 22, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF INVENTION

Field of Invention

The present invention refers to a transport device, a method, a transport system and a blow-molding machine for the blow-molding of containers made of a thermoplastic material.

Brief Description of Related Art

During container molding by blow pressure action, preforms made of a thermoplastic material, for example, made of PET (polyethylene terephthalate), are conveyed to various processing stations in the region of a blow-molding machine. Typically, such a blow-molding machine features a transport device for the conveyance of preforms to the blow-molding machine, a heating system for the thermal conditioning of the preforms and a blowing station with a blowing device, the region of this blowing device is where the tempered preforms are expanded to containers by means of biaxial expansion. The expansion occurs through the use of pressurized gas, which is introduced in the preform that is to be expanded.

The blow-molding machine must be provisioned with preforms without interruption for a continuous manufacturing process. Generally, the preforms are supplied to the blow-molding machine by means of a so-called preform conveyer. The preform conveyer generally consists of a silo, in which the preforms are provisioned in an unsorted manner, an ascending conveyer for selection and forwarding of the preforms provisioned in the silo, a roller conveyer that follows the ascending conveyer and that is employed for orientation of the preforms and a discharge rail that is located downstream of the roller conveyor, with which the preforms are fed, aligned and in a row, to the blow-molding machine. Generally, the preforms are transferred from the discharge rail to a transport wheel, with which they are conveyed to an area preceding a heating device.

Following the transfer of the preforms from the discharge rail to the transport wheel, the preforms typically undergo verification for defects and irregularities, and the preforms that are recognized as being defective or inappropriate for the blowing process are diverted from the transport stream by means of a selection apparatus before they get forwarded to the heating device.

The transport wheel for the acceptance of the preforms that are aligned and put in a row is generally constructed as a pocket wheel, whereby the preforms that are accepted in the pockets are transported in a conventional manner, hanging from a circular track between the transport wheel and an arched guide collar that is arranged radially to the transport wheel. An inspection device can be associated with the transport wheel for inspection and removal of inappropriate preforms, which recognizes preforms that are defective or not suitable for further processing. For the sorting of unsuitable preforms, existing knowledge tells us how to move the arched guide collar, on which the preforms are guided by means of the transport wheel, away from the transport wheel with a pivoting motion. The preforms that are being transported in a hanging manner between the guide collar and the transport wheel at the time of the pivoting are then ejected by this motion.

The described type of ejection mechanics has the disadvantage that multiple preforms that are hanging between the guide collar and the transport wheel are ejected at the same time. This means that not only are preforms that are unsuitable for further processing ejected, but rather also fully intact preforms that are properly suitable for the manufacture of containers. The described ejection mechanics does not however only lead to the unnecessary ejection of properly suitable preforms, but rather also leads to a delay in the further conveyance of the preforms. The pivoting motion of the guide collar is an alternating motion, by means of which the guide collar must initially be pivoted away from a start position and then once again pivoted backwards after the ejection of the preforms. In this time period, no further preforms can be conveyed by the transport wheel. The conveyance of further preforms to the transport wheel is generally stopped during this pivot time. Time-consuming outward and inward pivoting motions of such ejection mechanics are undesirable, in particular, when working at high process speeds, in which multiple preforms per second are blown out to containers.

It has also been shown that an inspection of the preforms that are conveyed in a hanging position between the transport wheel and a restraining collar that is radially arranged at the start of the transport wheel, are at times difficult to inspect for defects or irregularities. The restraining collar occasionally covers up areas of the preforms, which cannot be captured by the sensors of the inspection apparatus.

There is furthermore undesirable mechanical friction between the guide collar that is arranged on the perimeter of the transport wheel and the preform, which requires increased energy expenditure for the conveyance of the preforms and leaves behind friction marks on the preforms. It is also disadvantageous that it leads to wear and tear of the guide collar surfaces.

BRIEF SUMMARY OF THE INVENTION

With this in mind, the object of this invention is therefore to provide devices and methods that are improved compared to the existing state of the art, and which support a careful conveyance of preforms in the region of a blow-molding machine at high speeds and prevent the unforeseen ejection of preforms that are suitable for further processing.

This object is achieved through the use of a transport device, a method, a transport system and a blow-molding machine as disclosed herein. Advantageous embodiments are also disclosed.

The invention comprises a transport device, for the conveyance of preforms, made of a thermoplastic material, in the region of a blow-molding machine for the blow-molding of containers, featuring a transport wheel that is rotatable around a rotational axis having multiple receiving recesses distributed around its perimeter which are intended to receive and convey the preforms forward, whereby in the vicinity of the receiving recesses of the transport wheel there is, in each case, a hook element that is mounted on the transport wheel in a pivotable manner between an open position and a closed position, and whereby the hook element in the closed position secures the preform that is to be conveyed from falling out of the respective receiving recess. The hook element can, in particular, securely clamp the preform.

It is foreseeable that the recesses encompass the preforms in a somewhat pincer-shaped manner, in particular in an angular scope of 180° or more than 180°, to hold the preforms in the recesses, in particular for clampingly holding the preforms in the recesses. For this purpose, the hook element, in particular, physically makes contact with the preforms below a support ring that is located below its mouth area. Additionally or alternatively, for a clamping holding, it can be foreseen that the preform respectively sits on the edge of the transport wheel and/or on an edge of the hook element with their support ring.

It is imaginable that the rotation axis of the hook element and the rotation axis of the transport wheel are both on the same plane. In particular it is intended that the rotation axes of the hook element and the transport wheel run parallel to one another. In a preferential manner, it is foreseen that both the ejection star as well as also the transport wheel are mounted in a rotatable manner about rotational axes that are arranged in a fixed manner.

In a simple embodiment of the transport device according to the invention, it is possible that the transport device is laid out as a pocket wheel with pocket-like receiving recesses which are, in particular, arranged in an evenly-spaced manner on its circumference. It can be foreseen that the receiving recesses of the transport wheel are laid out in such a manner so as to, in each case, in the conveyance setting, at least partially encompass the preforms in the stem area below the support ring of the preforms.

In an embodiment, it can be foreseen that the transportation system features an ejection unit for the respective selective selection of one individual preform that is being conveyed in one of the receiving recesses of the transport wheel, whereby the ejection unit features an ejection ram that is longitudinally-variable between a thrust position and an at-rest position, and whereby the ejection ram when in the thrust position protrudes into the area of one of the receiving recesses in such a manner that a preform that is located in this receiving recess is ejected from the receiving recess. As an alternative to an ejection ram, it can be foreseen that a compressed air valve is used, with which a preform is ejected from the receiving recess by means of a blast of compressed air. In the rest position of the ejection ram, the transport of the preform on the rotating transport wheel is not disrupted. It is imaginable that in the thrust position, the ejection ram will eject the preform that is to be selected out of the receiving recess, overcoming the gripping strength of the hook element. It is also imaginable that the opening of the hook element is coupled with the longitudinal motion of the ejection ram, in such a manner that the hook element is moved upon activation of the ejection ram in the opening position.

It is possible that one could select or alternatively eject or divert individual preforms that are being conveyed on the transport wheel with the suggested selection unit. By this, one is to understand that during the selection, select preforms are diverted out of the conveyance flow and are thereby removed from the subsequent process stages of the manufacture of a container. It is understood that any number of preforms that are foreseen to be selected can be removed one after another from the conveyance flow in the area of the sorting device.

The suggested manner of sorting out the individual preforms has demonstrated itself to be particularly advantageous for high-speed transport processes. In contrast with traditionally used ejection mechanics, whereby preforms are sorted out of the conveyance flow by means of separator filters or by means of a forward and return pivoting guide collar, the suggested ejection expulsion motion by means of an ejection ram or alternatively by means of a blast of compressed air is particularly time-saving and efficient.

Since there is no need in the transport wheel according to the invention for a radial guide collar on the circumference, there is no need for a pivoting away of the collar, to eject a preform. This leads to increased performance of this type of transport devices with an ejection unit, the therewith associated conveyance systems, the related inspection systems as well as ultimately to the improvement in performance of a subordinate machine such as, for example, a blow-molding machine overall.

On top of the conveyance and the ejection or, alternatively, the deviation or preforms made of thermoplastic material, one could also foresee to design or set up the device for the conveyance or, alternatively, the handling of containers, in particular bottles or container seals or the like. For this, it could be necessary to adapt the transport device and/or components of the transport device that are described here.

A secure ejection of a preform, which is foreseen to be sorted out, is supported by the fact that the ejection ram forcibly displaces the preform that is to be ejected out of the receiving recess. It is hereby foreseen that the preforms that are to be selected are moved in an outward direction from the transport wheel, in particular, with a thrust-like action from the receiving recesses. In the forcibly-guided motion, the ejection ram preferably grasps the preform that is to be ejected in the mouth area and mechanically pushes the preform away from the transport wheel.

The transport device comprises an inspection device in a preferred embodiment, whereby the inspection device is designed and arranged to sensorially capture one of the preforms that are conveyed in one of the receiving recesses. The sensorial capturing can, in particular, be carried out in a contactless manner, for example, optically or acoustically. For this purpose, one can use suitable sensors and, where needed, a corresponding control. The inspection device is arranged in the area of the transport wheel such that a sensor of the inspection device can capture one of the preforms that is being conveyed in one of the receiving recesses, for example, with a sensor, the line of vision of which is transverse or diagonal to the longitudinal axis of the conveyed preforms.

In a preferred embodiment it is foreseen that the transport device comprises a curved segment that is mechanically movable with at least one of the hook elements in the open position or alternatively the closed position.

The curved segment can be laid with at least a stretch being a track, a groove or the like. It is imaginable that a cam disc can be used for the guidance of the hook element. In a simple embodiment, the hook element can be designed as a rocker that is rotatably mounted about a pivot axis on the transport wheel. In this embodiment, it is considered that the hook elements are conveyed alongside the curved segment during a rotation of the transport wheel and are mechanically forced in the open or alternatively closed position upon scanning of the curved shape.

Preferably, the curved segments are arranged in the regions of the transport wheel, in which no conveyance is foreseen, for example, downstream following an outlet area and prior to an inlet area. It can be desirable in this area that hook elements are always in the open position. Conversely, the curved section can be arranged in areas in which an opening of the hook elements is not foreseen in order to prevent the hook element from inadvertently switching to the open position. For example, downstream following an inlet area all the way to an ejection or outlet area.

The hook elements can be spring-loaded in a determined position, for example, in the open position or in the closed position or in an intermediate position. In so doing, it can be foreseen that the curved segment, through forcible actuation, moves the hook element from the spring-loaded position, whereby the hook element once again casually takes up and/or is guided by the curved segment to the position determined by the spring-loading after having passed the curved segment.

Alternatively or in addition to the use of a curved control by means of one or a multitude of curved segments, it can be foreseen that the hook elements each feature a drive, by means of which they are movable in the open position and/or in the closed position. The drive can, for example, be an electric motor, hydraulic or compressed-air operated drive.

The drives can be controlled or alternatively monitored by a central control of the transport device and/or by a control of a blow-molding machine. In the case where there is the ability to carry out individual control or monitoring of the hook elements, it is possible for an operator of the transport device or alternatively of the blow-molding device to easily undertake or modify control adjustments of the hook elements, without any need for mechanical adjustments to the device. Furthermore, misalignment of the hook elements can easily be monitored through the use of sensors. Modification of the motion profile of the hook elements can easily and quickly be undertaken in the event of adjustments of the machine to different process stages or other modifications of the blow-molding machine or the transport device.

It can be foreseen in a possible embodiment that the hook elements are maintained spring-loaded in the open or in the closed position. Alternatively, the hook elements can be maintained spring-loaded in an intermediate position between the closed and the open positions. A simple and, in particular, a passive return of the hook elements following a deviation from the open position or alternatively the closed position is possible with spring-loading.

It is foreseen in a preferred embodiment of the invention that the pivot axes of the hook elements are respectively arranged on the transport wheel oriented parallel to the rotation axis of the transport wheel. In the case of certain applications, it can alternatively be foreseen that the pivot axes of the hook elements are respectively arranged on the transport wheel oriented in a skewed or in a manner that intersects the rotation axis of the transport wheel. From a construction point of view, a parallel orientation of the rotation axes allows a simple and sturdy mounting of the pivot axes and also leads to an economical manufacturing of the components. The parallel orientation is particularly appropriate for the upright conveyance of preforms with an orientation that is transversal to the rotation plane of the transport wheel.

It is foreseen in a preferred embodiment that the transport device features a guide rail for the removal of preforms that protrudes in the area of the transport wheel in such a manner that the preforms being conveyed in the receiving recesses of the transport wheel are forcibly taken over by the guide rail and removed from the transport wheel. This facilitates the removal and further conveyance of the preforms. As an example, it can be foreseen that the preforms are conveyed in a hanging manner from the support ring between two guidance elements of the guide rail, preferably with the support ring sliding on the guidance elements.

For a simple adaptability of the process speed of the sorting device and for a seamless selection process in the case of a variation in the conveyer speed in areas of the transport device or of a transport system, it can be foreseen that the longitudinal thrust of the ejector ram can be synchronized with the rotation motion of the transport wheel.

In the case of a longitudinal thrust of the ejector ram that is synchronized with the transport wheel, it is considered that the velocity of the longitudinal thrust of the ejection ram and the rotation speed of the transport wheel have a linear dependence on one another. This can mean that upon increase of the rotation speed of the transport wheel, the velocity of the longitudinal thrust of the ejection ram will also increase in a linear manner during selection of an individual preform. The same also holds true upon a decrease in the speed. Alternatively or additionally, it has also been considered that one could foresee a non-linear dependence between the longitudinal thrust of the ejector ram and the rotation speed of the transport wheel. This allows for at least a temporarily accelerated longitudinal thrust of the ejection ram when compared to the transport wheel or alternatively the opposite.

The synchronization of the movements has advantages as regards the scalability of the process speeds. It is preferred to have the longitudinal thrust of the ejection ram timed in relation to the rotation speed of the transport wheel.

In the synchronization of the movements, consideration is given to the fact that a longitudinal thrust of the ejection ram is only possible in the thrust position when there is a preform in the actuation range of the ejector ram. An anticipated or retarded actuation of the ejection mechanism can thereby be prevented. Consideration has been given in this embodiment that the position of the transport wheel is captured and further processed for control of the ejection ram. This can occur through the use of a control that is provided for this purpose, for example, by means of control of the transport device or by means of control of a blow-molding machine.

There is also a method, according to the invention, for the conveyance of preforms to a blow-molding machine for the blow-molding of containers made of thermoplastic material, whereby preforms, that are put in a row and aligned, are transferred in the previously described manner to a first separation unit with a transport device for the conveyance of preforms according to the invention, the preforms are inspected in the area of the separation unit by means of an inspection device, and the preforms are subsequently transferred to an accumulation area for accumulation and/or to fill in gaps that have occurred in the meantime through the selection of individual preforms.

For a reliable recognition of defective or the further processing of unsuitable preforms, it can be foreseen that the preforms in the vicinity of the transport device are inspected for material irregularities in a contactless, in particular, optical manner.

In the method for conveyance of preforms according to the invention, the preforms that are put in a row and aligned are transferred to a separation unit. In so doing, it can be foreseen that the preforms are put in a row and aligned in the vicinity of a conveyance device that precedes the separation unit, in particular using a roller grader. The first separation unit is employed for the probing or alternatively the processing of individual preforms. The accumulation area that connects the first separation unit with the transport device can, for example, be laid out as an air conveyer and/or at least partially as a horizontal discharge rail.

In a further embodiment of the method it is envisaged that the preforms coming out of the accumulation area are transferred to a second separation unit and, following successful separation, are conveyed onwards without any gaps.

Upon the acceptance from the accumulation area and the onward conveyance of the preforms in the second separation unit, it is ensured that the preforms can be transferred without gaps and individually to further processing stations of the blow-molding machine. The closing of the gaps is advantageous, inasmuch as an interruption-free feed supports the manufacture of containers in the blow-molding machine.

Advantages and variants to the method according to the invention also result, amongst others, from the details of the transport device according to the invention that have been explained.

A transport system for the conveyance of preforms to a blow-molding machine for the blow molding of containers made of thermoplastic material is also according to the invention, wherein in the blow-molding machine is laid out and equipped to carrying out one of the methods described here above. In a preferred embodiment of the transport system, it is foreseen that the transport system features one of the previously described transport devices.

A blow-molding machine for the blow molding of containers made of thermoplastic material, featuring one of the previously described transport devices or one of the previously described transport systems, is also according to the invention. It is preferred that the blow-molding machine is laid out and equipped for the carrying out of one of the previously described methods.

BRIEF DESCRIPTION OF THE SEVERAL VIEWS OF THE DRAWINGS

Advantages and preferred embodiments of the blow-molding machine according to the invention result from the details which are explained relating to the transport device according to the invention, to the method according to the invention and to the transport system according to the invention.

Execution examples are represented schematically in the illustrations. These show.

DETAILED DESCRIPTION OF THE INVENTION

Figure 1:
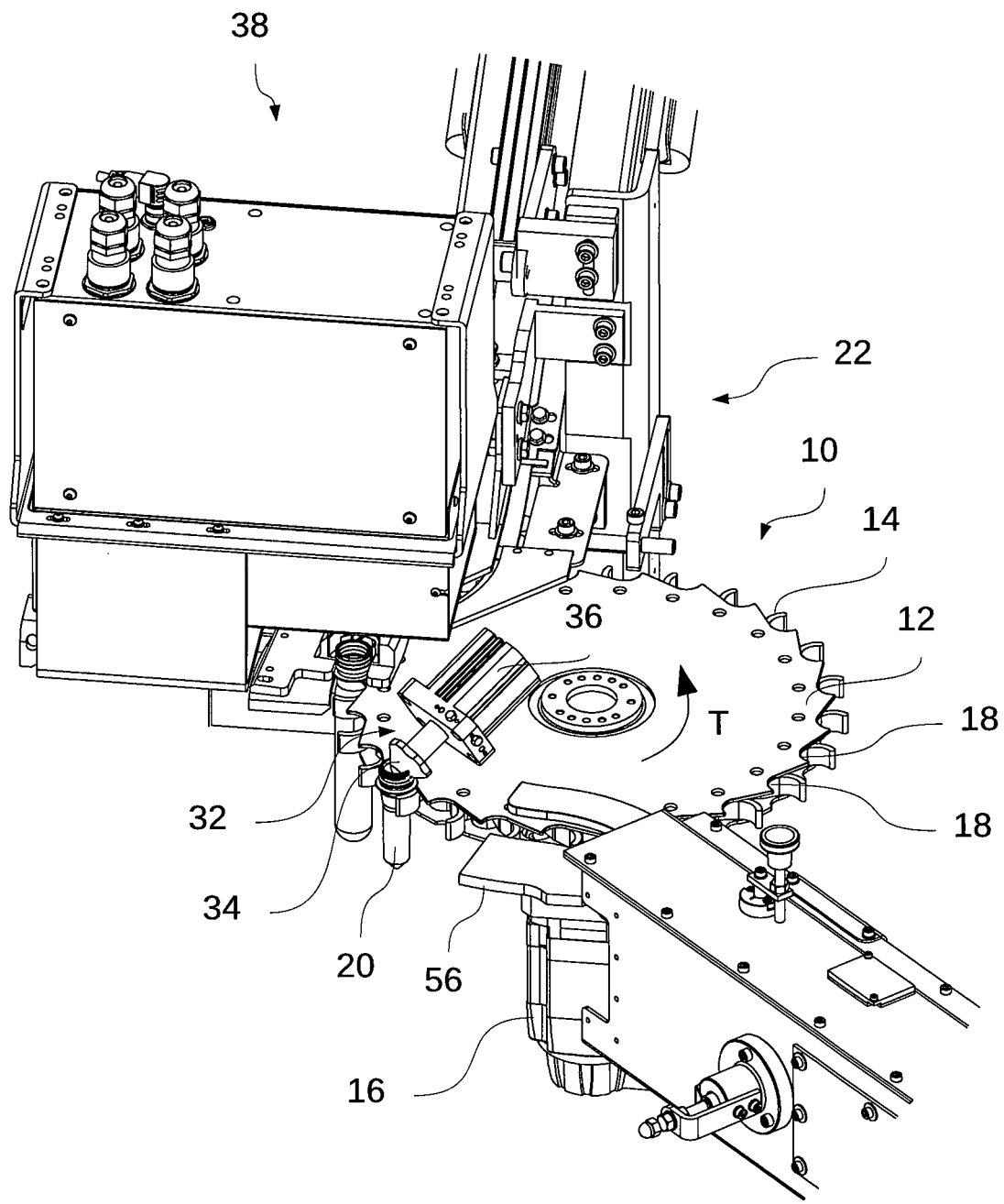
FIG. 1 a transport device and further components according to the invention, taken from a perspective view looking diagonally down, FIG. 2 the transport device and the further components from FIG. 1 from a perspective view looking diagonally upwards, FIG. 3 a transport wheel according to the invention with hook elements in the closed position in a perspective view looking diagonally upwards, FIG. 4 the transport wheel according to the invention from FIG. 3 with hook element in the open position in a perspective view looking diagonally down, and FIG. 5 a strongly schematic representation of a transport system with a transport device, an accumulation area and a separating device according to the invention.

FIG. 1 is an isometric representation of a transport device 10 according to the invention with a planar rotating transport wheel 12 and an ejection unit 32. Furthermore, there is an inspection device 38, an inlet area 22 as well as a guide rail 56 that are represented. The rotational direction of the transport wheel 12 that is foreseen for the transport of the preforms 20 is indicated with the directional arrow T.

The ejection unit 32 is arranged in the foreground from the illustration perspective, on top of the transport wheel 12. The ejection unit 32 has an ejection ram 34 that thrusts longitudinally from a drive 36. The ejection unit 32 is preferentially mounted to a carrier structure of the transport device 10, in particular, in a non-rotatable manner in comparison to the transport wheel 12. For simplification of the illustration and for better clarity—as in other portions of the illustrations—the representation of the carrier structure was omitted, which is to say, for example, the framework of the transport device 10 or alternatively the ejection unit 32.

The transport wheel 12 features pocket-like receiving recesses 18, which are designed to receive and secure preforms 20. During conveyance, the preforms 20 are at least encompassed for certain regions by hook elements 14 and maintained in the receiving recesses 18. The preforms 20 are thereby prevented from falling out of the transport wheel 12 during conveyance. The hook elements 14 are preferentially designed as rockers that are rotatably mounted about a pivot axis on the transport wheel 12. The rotatably mounted hook elements 14 are switchable in an open and a closed position.

As illustratively represented, an inlet area 22 is foreseen, that serves for the transfer of the preforms 20 to the transport wheel 12. For reception of a preform 20 in a receiving recess 18, the hook element 14 is switched into an open position. Upon reception of a preform 20 in a receiving recess 18, the hook element 14 is then switched to a closed position. It is for this purpose that the hook elements 14 are respectively pivotably mounted on the transport wheel 12.

Figure 2:
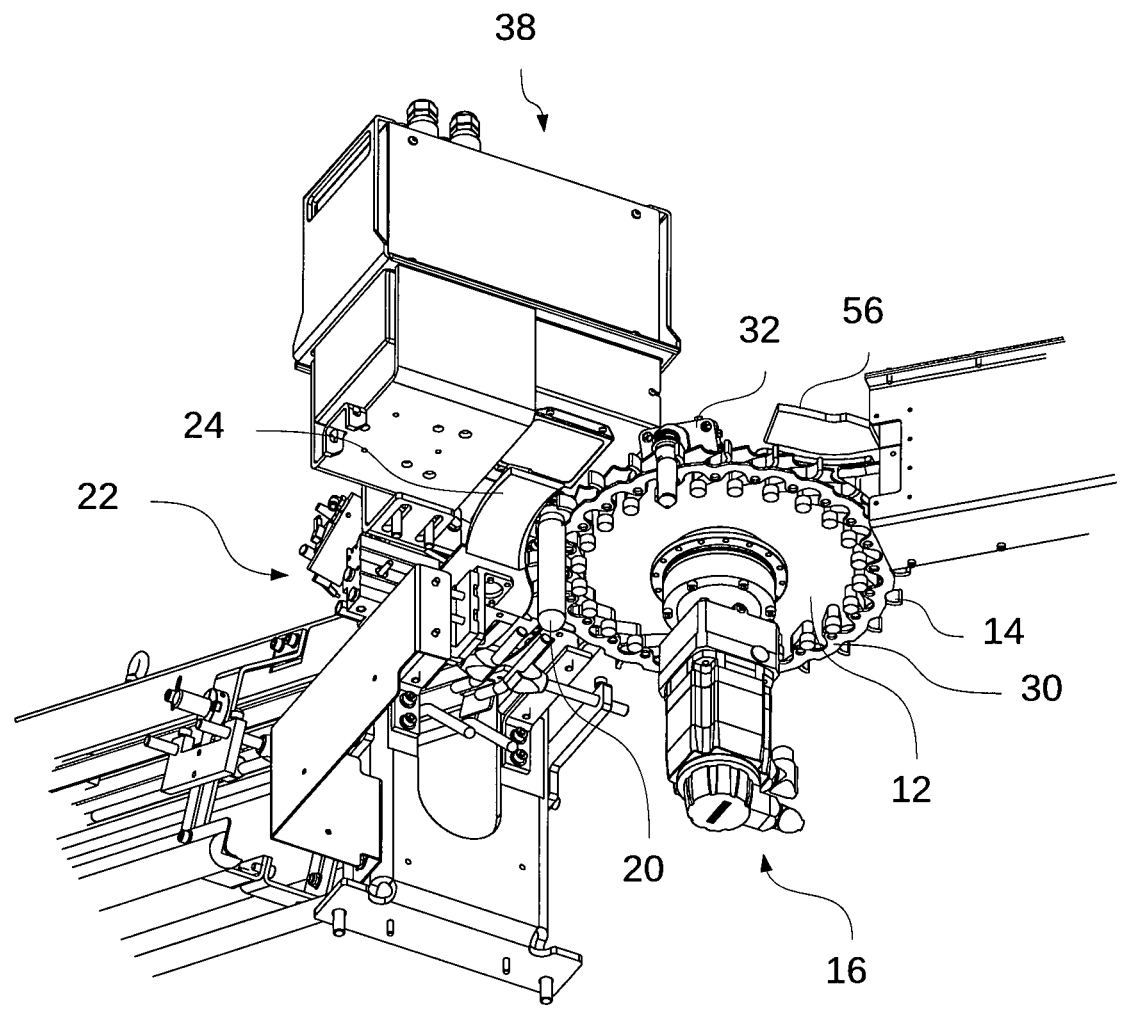

As represented in FIGS. 1 and 2, an inspection device 38 is preferentially arranged in the area of the transport device 10. The inspection device 38, for example, serves the purpose of recognition of the preforms 20 that are unsuitable for the blowing process. This information can be useful for the control of the ejection unit 32.

It is foreseen in the represented variant that the ejection unit 32 pushes or shifts aside the preforms 20 that are to be selected with directional components that radially guide them outward from the transport wheel 12. In this case, the thrust axis of the ejection ram 34 is aligned diagonally to the rotational plane of the transport wheel 12. A preform 20 that is to be sorted is thereby contacted by the ejection ram 34 diagonally from above in the perspective of the illustration.

In a purely schematic manner, a preform 20 is shown in the direction of impact of the ejection ram 34 that is held in one of the receiving recesses 18 by a hook element 14. As is represented here in a simplified schematic form, the ejection ram 34 preferentially contacts the preform 20 that is to be sorted in its neck area.

A guide rail 56 that is arranged downstream in the conveyance direction of the preforms from the ejection unit 32 takes over the preforms 20 that are conveyed by the transport wheel 12 and guides the same away from the transport wheel 12 for further conveyance. In particular, it is foreseen that for this purpose, the corresponding hook element 14 is switched into the open position during the transfer of the preform 20 to the guide rail 56.

A drive 16 that is required for the transport wheel 12 is shown, from the perspective of the illustration, underneath the transport wheel 12. As represented, the transport wheel drive 16 can be foreseen both as a transmission as well as also a supporting bracket for the transport wheel 12. The drive 16 can therefore be affixed to a support framework of the transport device 10. As also elsewhere in the Figures, for better clarity, representation of the support points of the drives 16 as well as of the transport device 10 were omitted.

FIG. 2 shows an isometric representation of the transport device 10 from FIG. 1 as viewed diagonally from the bottom. The hook elements 14 are readily recognizable from the perspective of FIG. 2. In this case, the hook elements 14 are arranged between the transport wheel 12 and a holder structure 30 that is preferentially laid out in a ring-like shape. The holder structure 30 can contribute to the stabilization of the hook elements 14 and for the stable guidance of the preforms 20. The holder structure 30 can also feature receiving recesses for the guidance of the preforms 20. The receiving recesses of the holder structure 30 can correspond with the orientation and/or the shape of the receiving recesses 18 of the transport wheel 12.

Figure 3:
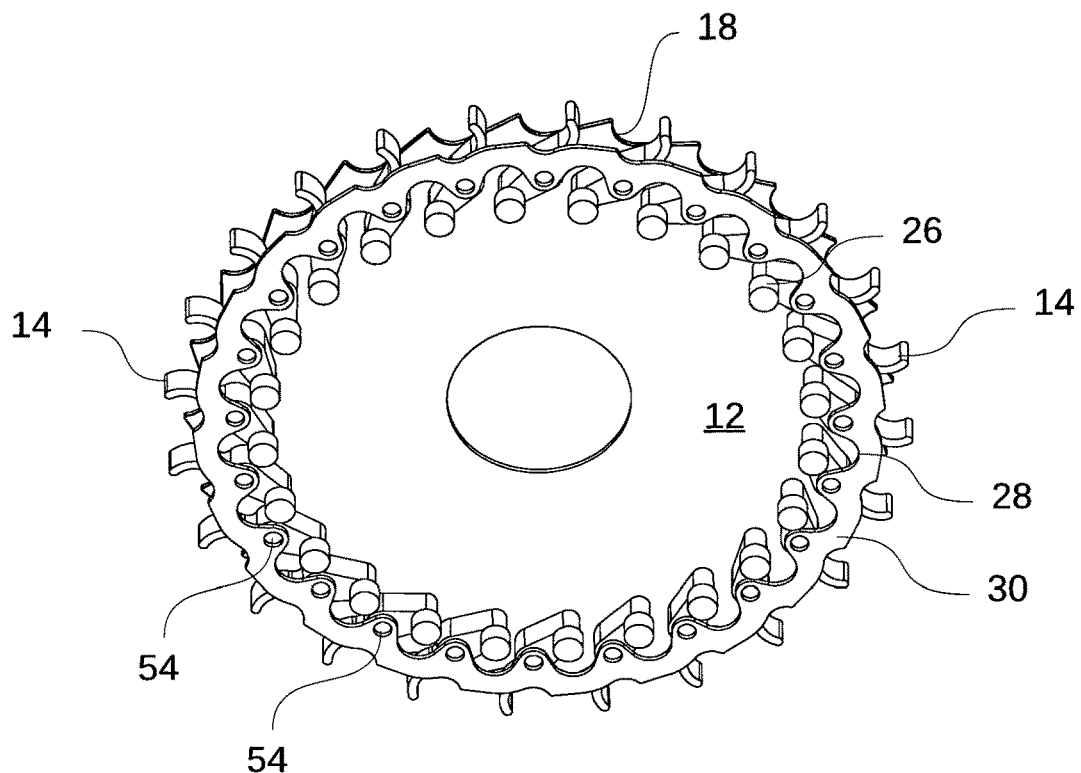
Figure 4:
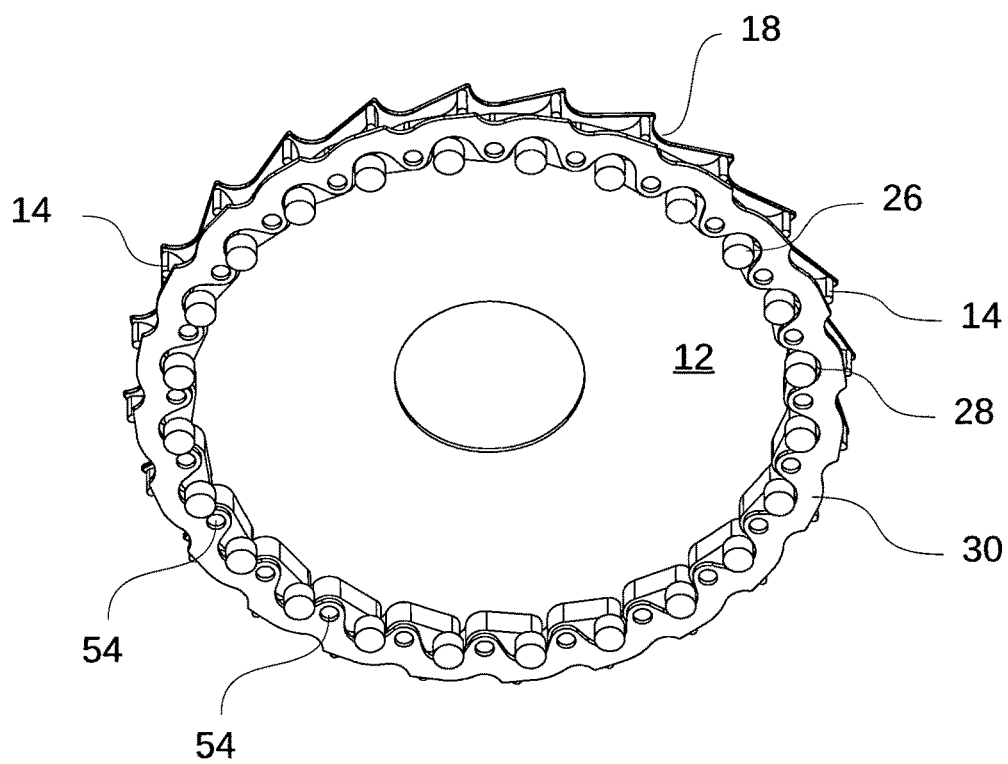

The FIGS. 3 and 4 show the transport wheel 12 according to the invention from FIGS. 1 and 2 in a perspective point of view from diagonally underneath. In FIG. 3, the hook elements 14 are shown in a closed position and in FIG. 4 in an open position. In this case, the hook elements 14 are readily recognizable as being sandwiched between the transport wheel 12 and a holder structure 30 that runs parallel to the transport wheel 12. Machine structures 28 can be arranged on the holder structure 30, against which one of the limit stops 26 that are arranged on the hook elements 14 respectively strike when the hook element 14 is switched in an open position. As is indicated in FIGS. 3 and 4, the limit stops 26 can, for example, be designed as cylinders. The pivot axis mount 54 of the hook element 14 is also readily recognizable.

Figure 5:
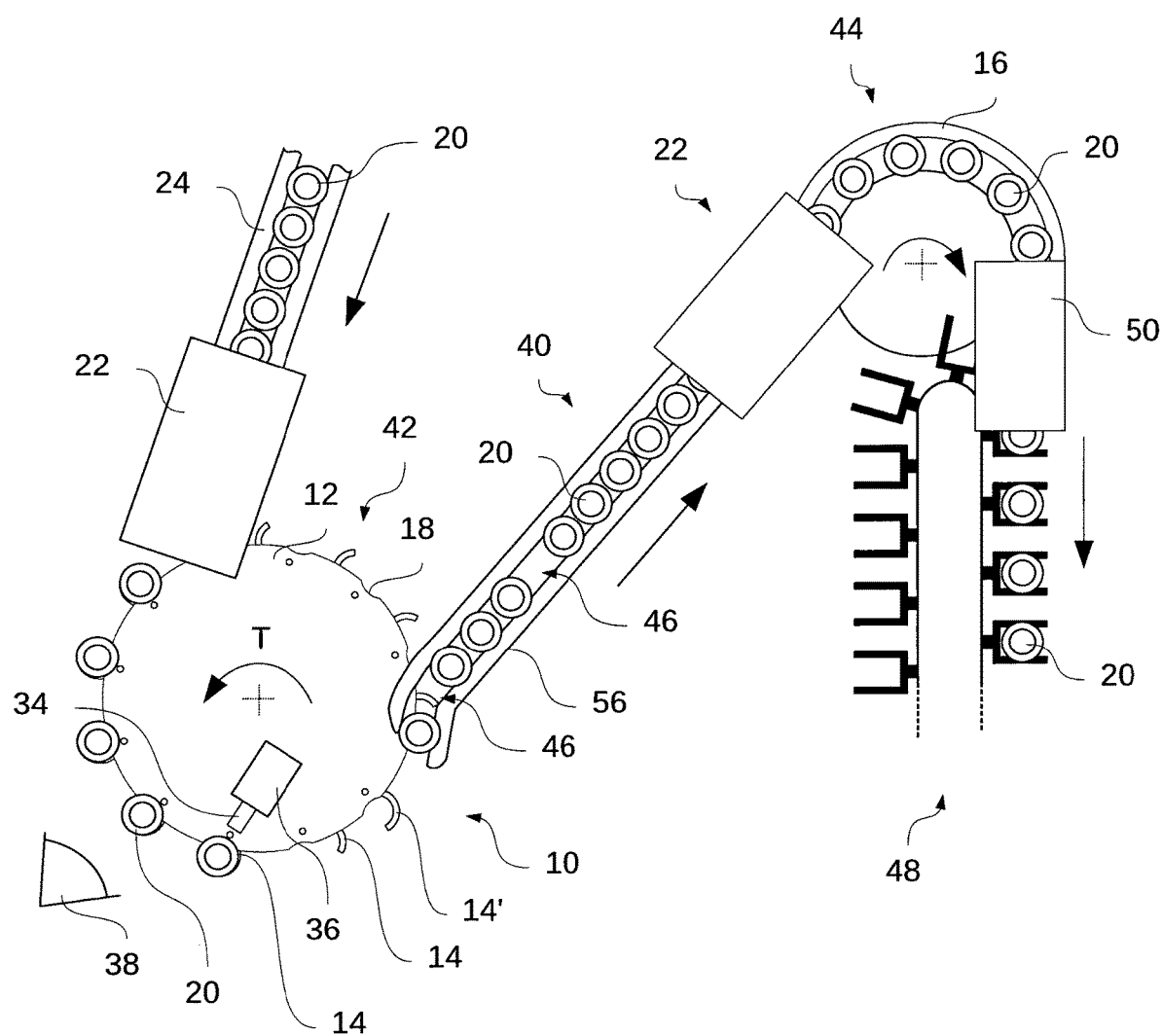

FIG. 5 shows a transport system in a strongly schematic manner, with a transport device 10 according to the invention. Graphic details were omitted for the purpose of better clarity. In this Figure, an inlet area 22 is shown that transfers preforms 20 to a first separation unit 42 with a transport device 10 laid out according to the invention. The Inlet area 22 takes on preforms 20, which preferentially have been put in a row and aligned, from an inlet track 24 which in the conveyance direction of the preforms 20 is upstream of the inlet area 22. The preforms 20 are transferred to the transport wheel downstream of the inlet area 22. The preforms 20 are conveyed following the circumferential direction of the transport wheel 12 in the area of the transport device 10 by means of rotation of the transport wheel 12 while being secured by the hook elements 14 in the receiving recesses 18. The open position of the hook element 14 is indicated in the case of unoccupied receiving recesses 18. For the purpose of illustration, at 14' one will find an unoccupied receiving recess 18 with a closed hook element. The principle of hook holding is illustrated by the side-by-side representation of hook elements in an open and a closed position. Details of the transport device, in particular individual components can be laid out as described previously in the preceding Figures.

An inspection device 38 inspects the preforms 20 that are conveyed on the transport wheel 12. Upon recognition of a preform 20 that is unsuitable for further processing or alternatively for further conveyance, an ejection unit 32 according to the invention is controlled in such a way that the preforms 20 that have been recognized as being unsuitable will respectively and individually be moved out, deviated or alternatively be ejected from the conveyance flow of the preforms 20.

Gaps 46 occur in the conveyance flow when sorting out individual preforms 20, which must be filled in for the orderly further conveyance. In the variant that is represented, for the filling in of these gaps 46 it is proposed to arrange an accumulation area 40 subsequent to the transport device 10. The accumulation area can, for example, be designed as an air conveyor stretch. As an imaginable alternative, the accumulation area 40 can be designed at least in stretches as a discharge rail that runs horizontal and/or inclined. The accumulation area 40 joins a further inlet area 22, which takes over the preforms 20 and transfers them to a second separation unit 44.

The preforms 20 are separated by means of the second separation unit 44 for further conveyance in the area of a blow-molding machine (not illustrated), for example, for conveyance to a heating section (not illustrated). For this, it can, for example, be foreseen that the preforms 20 in the area of the second separation unit 44 are transferred to an outlet area 50, in particular by a transport wheel that is associated with the separation unit 44, which in turn transfers the preforms 20 to an individual transport area 48. Details of the shown transport wheel of the second separation unit 44 can be laid out as they are in the transport wheel 12 of the transport device 10. Alternatively or additionally, one could foresee a traditional lay-out of the transport wheel. For example, it could be foreseen that there is exclusively or additionally a guide collar that is arranged at a radial distance for the securing of the preforms 20. In the variant that is shown, it is indicated in a purely schematic manner that the individual transport area 48 can be laid out as a carrousel with conveyance cradles that are attached to it for the conveyance of separated preforms 20. Other commonly used conveyance stretches are also imaginable for the conveyance of the separated preforms 20.

The transport device shown here allows the sorting out of preforms 20 that are recognized as being unsuitable and ensures the closing of gaps 46 which have occurred with selected preforms 20, in such a manner that an uninterrupted and gapless conveyance flow of preforms 20 is made possible for feeding of a blow-molding machine, in particular to the heating device of a blow-molding machine, with limited device complexity.

LIST OF REFERENCE NUMBERS

10 Transport device
12 Transport wheel
14 Hook element
16 Transport wheel drive
18 Receiving recess
20 Preform
22 Inlet area
24 Inlet track 26 Limit stop
28 Machine structure
30 Holder structure
32 Ejection unit
34 Ejection ram
36 Drive
38 Inspection device
40 Accumulation area
42 First separation unit
44 Second separation unit
46 Gap
48 Individual transport area
50 Outlet area
54 Pivot axis mounting
56 Guide rail
T Rotational direction of the carrying wheel

The invention claimed is:

1. A transport device for conveying preforms made of a thermoplastic material in a region of a machine that blow-molds the preforms to form containers, said transport device comprising a transport wheel that is mounted in a rotatable manner about a rotational axis, wherein a plurality of receiving recesses are provided in a circumferential edge the transport wheel, each recess being configured to receive and convey one of said preforms, said transport device further comprising a plurality of hook elements, wherein one of said plurality of hook elements is arranged on the transport wheel in a region of each one of said plurality of receiving recesses, wherein each of said plurality of hook elements is mounted on the transport wheel in a manner so as to be pivotal between an open position and a closed position, wherein when in the closed position, each of said hook elements secures one of said preforms to be transported in a respective receiving recess so as to prevent said one of said preforms from falling out of the respective receiving recess, wherein the transport device further comprises an ejection unit for selective ejection of one of said preforms that is conveyed in one of said plurality of receiving recesses of the transport wheel, wherein the ejection unit includes an ejection ram that is longitudinally movable between a striking position and a position at rest, and wherein in the striking position the ejection ram protrudes into the region of one of the plurality of receiving recesses in such a manner that a preform that is secured in said receiving recess is ejected out of said receiving recess.

2. The transport device according to claim 1, wherein the transport device further comprises an inspection device, wherein the inspection device is configured and arranged to sensorially capture one of the preforms that is conveyed in one of the receiving recesses.

3. The transport device according to claim 1, wherein the transport device further comprises a curved segment that mechanically switches at least one of the plurality of hook elements to the open position or alternatively to the closed position.

4. The transport device according to claim 1, wherein each of said plurality of hook elements is operatively associated with a drive mechanism for switching said plurality of hook elements into the open position and/or into the closed position.

5. The transport device according to claim 1, wherein the plurality of hook elements are spring-loaded to remain in the open position or in the closed position.

6. The transport device according to claim 1, wherein a pivot axis of each of the plurality of hook elements mounted on the transport wheel is oriented parallel to the rotational axis of the transport wheel.

7. The transport device according to claim 1, wherein the transport device further comprises a guide rail for removing preforms, said guide rail protruding into an area of the transport wheel in such a manner that preforms being conveyed in the receiving recesses on the rotating transport wheel are taken over by the guide rail and removed from the transport wheel in a forcebly-guided manner.

8. The transport device according to claim 1, wherein a longitudinal thrust of the ejection ram is synchronized with the rotational movement of the transport wheel.

9. A method for conveying preforms made of a thermoplastic material to a blowing machine for blow-molding the preforms into containers, the method comprising:
putting the preforms in a row and aligning the preforms for transfer to a first separation unit using a transport device according to claim 1,
inspecting the preforms in an area of the separation unit with an inspection device, and
transferring the preforms to an accumulation area for accumulation and/or for filling in gaps which have occurred through selection of an individual preform.

10. The method according to 9, wherein each of the preforms is inspected for material irregularities in a contactless manner in an area of the transport device using the inspection device.

11. The method according to claim 9, wherein the preforms originating from the accumulation area are transferred to a second separation unit and for further transport without gaps.

12. A transport system for conveying preforms made of a thermoplastic material to a blowing machine for blow-molding the preforms into containers, which is configured and arranged to execute the method according to claim 9.

13. A blowing machine for blow-molding of containers from preforms made of thermoplastic material comprising a transport device according to claim 1.

14. The method according to claim 10, wherein the inspection device optically inspects each of the preforms for material irregularities.

15. The transport system according to claim 12, wherein the transport device further comprises an inspection device, wherein the inspection device is configured and arranged to sensorially capture one of the preforms that is conveyed in one of the receiving recesses.

16. The transport system according to claim 12, wherein the transport device further comprises a curved segment that mechanically switches at least one of the plurality of hook elements to the open position or alternatively to the closed position.

17. The transport system according to claim 12, wherein each of said plurality of hook elements is operatively associated with a drive mechanism for switching said plurality of hook elements into the open position and/or into the closed position.

18. The transport system according to claim 12, wherein the plurality of hook elements are spring-loaded to remain in the open position or in the closed position.

19. The transport system according to claim 12, wherein a pivot axis of each of the plurality of hook elements mounted on the transport wheel is oriented parallel to the rotational axis of the transport wheel.

20. The transport system according to claim 12, wherein the transport device further comprises a guide rail for removing preforms, said guide rail protruding into an area of the transport wheel in such a manner that preforms being conveyed in the receiving recesses on the rotating transport wheel are taken over by the guide rail and removed from the transport wheel in a forcebly-guided manner.

21. The transport device according to claim 1, wherein a longitudinal thrust of the ejection ram is synchronized with the rotational movement of the transport wheel.

* * * * *